Sept. 1, 1953 I. W. TWIFORD 2,650,654
LEG REST FOR VEHICLE SEATS
Filed Oct. 15, 1948
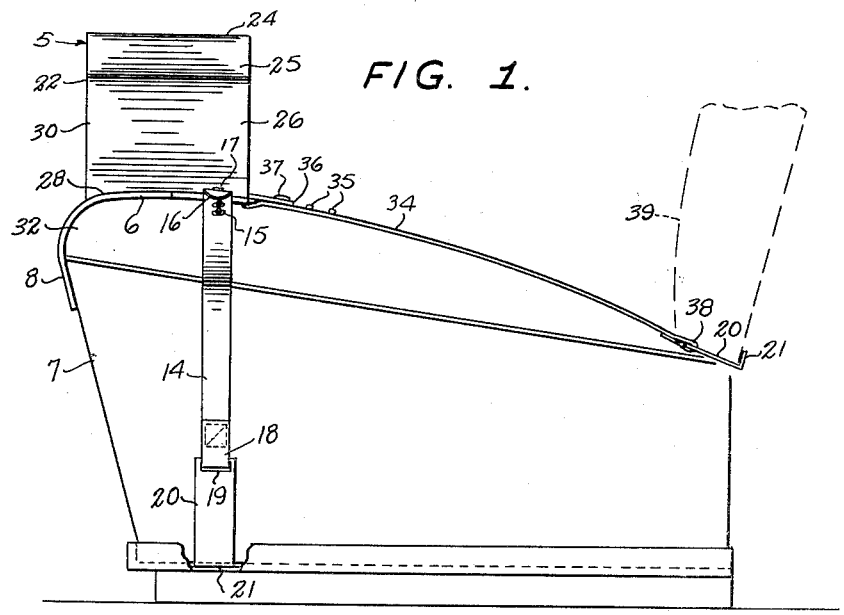
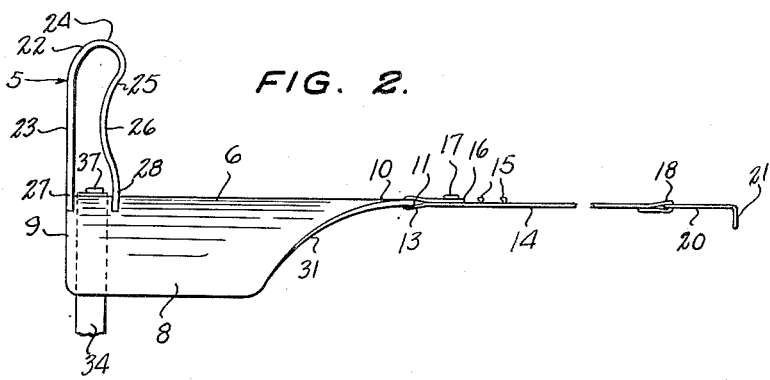
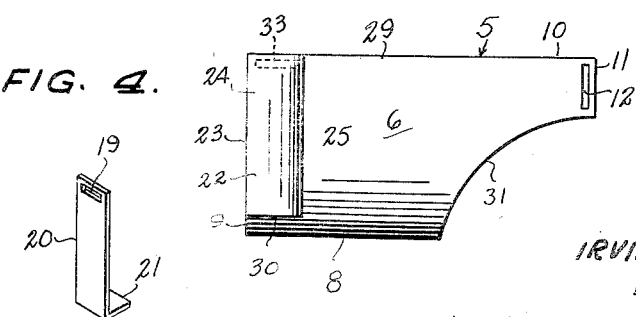
INVENTOR.
IRVING W. TWIFORD,
BY
McMorrow, Berman + Davidson
ATTORNEYS.

Patented Sept. 1, 1953

2,650,654

UNITED STATES PATENT OFFICE 2,650,654

LEG REST FOR VEHICLE SEATS

Irving W. Twiford, Moorcroft, Wyo.

Application October 15, 1948, Serial No. 54,787

3 Claims. (Cl. 155—165)

1

This invention relates to vehicle seats, and refers particularly to a leg rest for ensuring the comfort and convenience of operators of automobiles.

The main object of my invention is to provide means mounted upon the cushion of the operator's seat of an automobile against which the operator may rest his knee sidewise to avoid fatigue while driving.

Another object is to adjustably attach such means on the operator's seat cushion which is readily applied or removed at will, and when once set in place will remain in position during use and also when the operator stands up and leaves the seat.

A further object is to have a leg rest as indicated which in part conforms to the forward curvature of the seat cushion upon which it is mounted and has projecting means thereon forming an abutment for resting the right knee against it in relaxed condition.

It is also an object to have such a leg rest made of plastic or metal in light yet durable form, and which is easily manufactured and sold at a reasonable figure.

Other objects and advantages of my invention will appear in further detail as the specification proceeds.

In order to facilitate ready comprehension of this invention for a proper appreciation of the salient features thereof, the invention is illustrated on the accompanying drawing forming part hereof, and in which:

Figure 1 is a side elevation of a leg rest made according to the invention and embodying the same in a practical form, the figure showing the leg rest in operative position upon the cushion of the driver's seat;

Figure 2 is a front elevation of the same leg rest as seen from the left in Figure 1;

Figure 3 is a plan view of the same leg rest as seen from above in Figure 2;

Figure 4 is a perspective view of one of several steel hooks that are used to anchor the leg rest of Figures 1, 2 and 3 to the driver's seat cushion.

In the views, the same reference numerals indicate the same or like parts.

When driving an automobile, it is at least occasionally necessary to change the speed of the car by stepping on the brake or the accelerator pedal and otherwise controlling the vehicle involved by various maneuvers requiring the use of the right leg. Normally, however, it is necessary to hold the leg erect ready at a moment's notice for placing the foot upon the accelerator or brake

2 pedal, as already mentioned, but such a position of the leg held for any considerable length of time is very fatiguing. This is emphatically true if it is attempted to drive long distances, and then the fatigue becomes so acute that the distance traveled is virtually limited to that which the right leg can tolerate without becoming overfatigued to the actual point of suffering pain.

Upon considering this problem, it has occurred to me that means should be available for mounting upon the cushion of the driver's seat against which the right knee may rest without effort and in relaxed condition, and that the use of such a rest will actually contribute materially to an increase of the distance which may be driven before fatigue calls a halt to the driving.

As a result, I have succeeded in producing a leg rest which may be applied to the forward portion of an operator's seat cushion in such fashion as to afford convenience, comfort and rest for the leg normally used for operating the pedals, as will now be fully explained.

Hence, in the practice of my invention, and referring again to the drawing, an operator's leg rest, generally indicated at 5, primarily includes a curved plate 6 adapted to rest upon the forward portion at the right side of a cushion 7 forming the driver's seat, the forward portion 8 of plate 6 being curved to conform to the curvature of the forward edge of cushion 7 in such fashion as to fit upon the seat and conform to the shape thereof. At the far end of the plate 6 the end 9 is cut substantially straight, while at the other end the rear portion is extended laterally across the seat at 10 and terminates in the attachment end 11 having a slot 12 for receiving a loop 13 of a fabric, leather or plastic strap 14. Upon this strap 14 are fixed a plurality of snap fastener knobs 15, while the end 16 of the strap has a corresponding snap fastener head 17 adapted to engage with any one of the knobs 15 in order to adjust the length of the strap. Upon the other end of the latter is formed a loop 18 engaging in a slot 19 in one end of metal strip 20, as may be noted in Figures 1, 2 and 4, the end of strip 20 being bent upwardly to form a hook 21 adapted to engage beneath the bottom of cushion 7, thus anchoring the plate 6 against lateral movement in the direction of its end 9.

Extending vertically from the mentioned edge 9, the plate 6 is provided with an upright abutment 22 having the outer wall 23 virtually flat, while at the upper end thereof it is bent to form a loop 24 at which point the abutment 22 bends downwardly to form an inner abutment wall 25 which is concavely curved at 26 to receive the side of the leg when resting against the same. At the lower ends 27 and 28 of abutment walls 23 and 25, the latter are permanently secured to the plate 6 so that the abutment 22 will be a permanent projection thereon virtually integral therewith. Preferably, plate 6 and abutment 22 are made of plastic, such as methyl-methacrylate, ordinarily known on the market as Lucite or Plexiglas, and obviously the abutment 22 may then be cemented to plate 6 in such fashion as to be virtually fused into an integral part thereof. In case it is desired to make plate 6 of metal and the abutment as well, the latter may, of course, be soldered, brazed or welded to plate 6 according to choice.

The mentioned abutment 22 extends virtually to the rear edge 29 of plate 6, while forwardly it extends to the curved portion 8 but terminates at its forward edge 30 short of the forwardly-extending portion of curved section 8, but it is nonetheless sufficiently extensive from front to back to form a wide comfortable abutment for the right leg against which the leg may rest when disposed upon plate 6. The laterally-extending rear portion 10 causes plate 6 to be wider along the rear edge 29 than at the forward edge or end 8, the forward portion of the plate remote from abutment 22 having a cut-away portion 31 to eliminate excess material which is not necessary for the present purpose.

In order to anchor plate 6 also against forward movement off the front end or edge of seat 7 and in order to maintain the curved forward portion 8 upon the curved edge 32 thereof, the plate 6 within the hollow abutment 22 immediately forward of the rear edge 29 has a second attachment slot 33 to which a further strap 34 is connected by means of snap fastener head 37 on strap end 36 adapted to engage with any one of a plurality of snap fastener buttons 35. The strap 34 is adapted to extend rearwardly upon cushion 7 and terminates in a loop similar to previously-described loop 18 on strap 14, and in similar fashion also engages in the slot 19 of a plate or strip 20 having a rear hook 21 engaging beneath the rear side of the back cushion indicated in broken lines at 39 which rests on cushion 7. If desired, plate 6 with abutment 22 may be covered with fabric, sheet plastic of the vinyl type, or may be left exposed as shown. Anchoring straps 13 and 34 may be made of fabric, flexible plastic, leather or any material which will serve the purpose, while strips 20 with their integral hooks 21 are preferably made of stainless steel or any other material which will serve this purpose.

From the foregoing, it is evident that when the driver is seated on cushion 7 with the right leg resting on plate 6, the knee will rest comfortably against abutment 22 in such fashion that it is not necessary to hold the knee erect as it will be retained in erect position by the abutment so that the leg will be ready at any moment to place the foot on either brake pedal or accelerator pedal by direct movement from the position already virtually enforced by the presence of the abutment. Normally, the leg will then easily be relaxed and no effort will be required to maintain the leg upright in preparation for placing the foot upon either pedal at a moment's notice. It is self-evident that when the leg is not strained by the necessity of holding the leg by sheer effort in upright position, but may be relaxed most of the time while driving, it will be possible to drive greater distances than heretofore without fatigue.

Manifestly, variations may be resorted to and parts and features may be modified or used without others within the scope of the appended claims.

Having now fully described my invention, I claim:

1. The combination with the operator's seat of an automotive vehicle including a seat cushion having a curved forward edge, and a back cushion, of a leg rest including a plate fitting upon the forward portion of the seat cushion with the forward portion of the plate curved downwardly to conform to the curved forward edge of said seat cushion, an upwardly-projecting abutment fixed upon one end of the plate against which the operator's leg may rest when disposed on said plate, a laterally-arranged strap connected to the other end of the plate and having a hooked metal anchoring strip upon the end thereof adapted to be engaged beneath the bottom edge of said seat cushion at the end thereof remote from said abutment, and a second, rearwardly-extending strap attached to the rear portion of said plate at said abutment and having a hooked metal anchoring strip upon the rear end thereof adapted to engage beneath the rear bottom edge of said back cushion to retain said plate and abutment in position on said seat cushion.

2. The combination with the operator's seat of an automotive vehicle including a seat cushion having a curved forward edge, and a back cushion, of a leg rest including a rigid plate fitting upon the forward portion of the seat cushion with the forward portion of the plate curved downwardly to conform to the curved forward edge of said seat cushion, one end of said plate being substantially straight upon at least the upper portion thereof, an upwardly-projecting abutment comprising a pair of spaced walls integrally interconnected at the upper ends therewith the lower ends of said walls fixed upon the plate with one wall secured at the straight end of said plate and both walls extending substantially to the rear edge of the latter and forwardly extending to the curved portion of said plate, said plate having a cut-away portion forwardly at the end opposite to that carrying the abutment, the rear portion of the plate extending remotely from said abutment and having an attachment slot therein with a laterally-arranged strap connected to said slot and having a hooked metal anchoring strip upon the end thereof adapted to be engaged beneath the bottom edge of said seat cushion at the end thereof remote from said abutment, said plate also having a second attachment slot in the rear portion thereof between the two walls of the abutment with a second strap attached to said slot portion and extending rearwardly therefrom and upon the rear end thereof having a second hooked metal anchoring strip adapted to engage beneath the rear bottom edge of the back cushion to retain the plate and abutment in position on said seat cushion.

3. The combination with the operator's seat of an automotive vehicle including a seat cushion having a curved forward edge and a back cushion, of a leg rest including a plate made of methyl-methacrylate fitting upon the forward portion of the seat cushion with the forward portion of the plate curved downwardly to conform to the curved forward edge of said seat cushion, an upwardly-projecting abutment consisting of a pair of spaced walls of methyl-methacrylate cemented at the lower end of the pair to the plate with one wall substantially flush with the end of said plate and the other wall spaced inwardly of the first-mentioned wall and having the intermediate portion thereof concavely arcuate, while the upper ends of the walls are joined in a curved portion at the top so that both walls are integral and spaced substantially the same distance apart at the upper and the lower ends and both walls extending from the rear portion of the rest plate forwardly to the curved forward portion thereof, a cut-away portion being cut in upon the forward portion of the plate at the end remote from the abutment, and the rear portion or edge of the plate being longer than that of the forward edge, said plate having an attachment slot within the rear edge thereof between the two walls of the abutment, the rear opposite end of said plate also having an attachment slot therein, a pair of attachment straps being looped through the slots in said plate, each having a plurality of snap fastener buttons thereon and a snap fastener head adapted to engage with said buttons selectively, and a metal hooked anchoring strip having an attachment slot therein engaged by the outer ends of said straps and secured thereto, each strip having an end hook adapted to engage with the seat cushion in one case and with the back cushion in the other case to prevent displacement of said plate from off the forward portion of the seat cushion.

IRVING W. TWIFORD.

References Cited in the file of this patent

UNITED STATES PATENTS

| Number | Name | Date |
| --- | --- | --- |
| 1,682,071 | Finn | Aug. 28, 1928 |
| 2,100,737 | Foster | Nov. 30, 1937 |
| 2,168,976 | Clarke | Aug. 8, 1939 |
| 2,225,818 | Brooks | Dec. 24, 1940 |
| 2,522,887 | Nelson | Sept. 19, 1950 |